3,769,234
PROCESS FOR PRODUCING ACTIVATED TITANIUM TRICHLORIDE-ALUMINUM TRICHLORIDE
Arthur P. Haag, Moraga, and Meyer Weiner, Orinda, Calif., assignors to Dart Industries Inc., Los Angeles, Calif.
Filed Feb. 9, 1970, Ser. No. 9,615
Int. Cl. B01j 11/78
U.S. Cl. 252—442
8 Claims

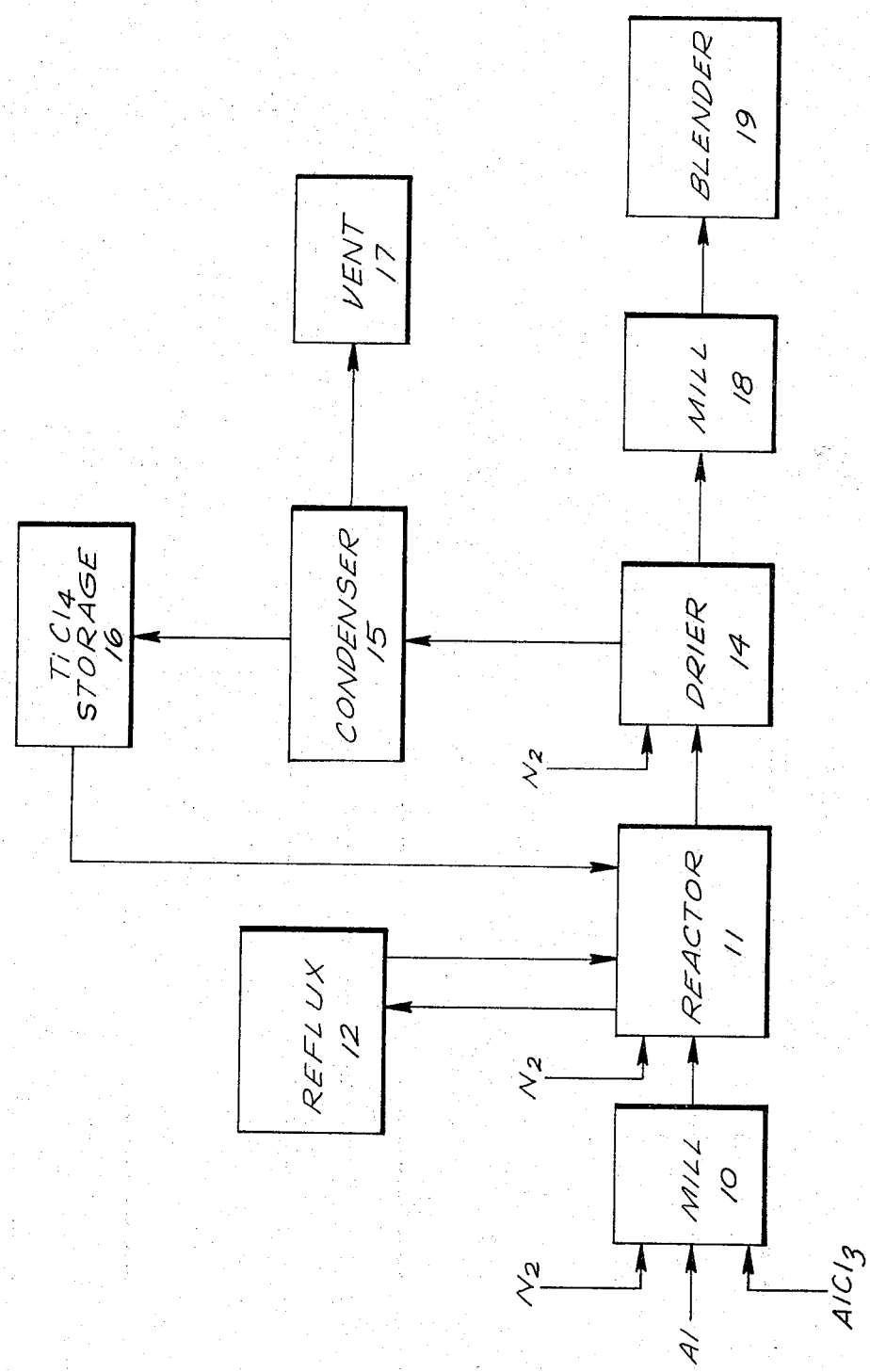

ABSTRACT OF THE DISCLOSURE

An improved process for producing co-crystals of titanium trichloride and aluminum trichloride with a desired composition, preferably substantially three moles of titanium trichloride and one mole of aluminum trichloride and substantially free of impurities is described. Such crystals are of value as an active catalyst, particularly, for example, for preparing polypropylene. The co-crystals are prepared by reacting titanium tetrachloride with aluminum in an excess of titanium tetrachloride. After reaction, excess titanium tetrachloride is vaporized by heating the co-crystals. The improved process provided herein involves dry ball milling of aluminum trichloride with aluminum powder prior to reacting with titanium tetrachloride so that a selected excess of aluminum trichloride over the desired composition is present in the product to compensate for aluminum trichloride volatilized in the drying operation. This serves the multiple functions of yielding co-crystals of controlled composition, activating the aluminum powder for complete reaction, promoting initiation of reaction between aluminum and titanium tetrachloride and enhancing rate of reaction to obviate any need for stirring of the reaction mixture.

BACKGROUND

This invention is related to processes described and claimed in copending U.S. patent applications related to production of co-crystals of titanium trichloride and aluminum trichloride. These copending patent applications are Ser. No. 9,613 entitled "Process for Producing Titanium Trichloride-Aluminum Trichloride in Controlled Proportions" by Arthur P. Haag and Meyer Weiner, and Ser. No. 9,614 entitled "Removal of Titanium Tetrachloride from Titanium Trichloride-Aluminum Trichloride" by Arthur P. Haag and Meyer Weiner. The descriptions of these copending patent applications are hereby incorporated by reference for full force and effect as if set forth in full herein.

A combination of titanium trichloride and aluminum trichloride having a substantially stoichiometric quantity of these two compounds with three moles of titanium trichloride to each mole of aluminum trichloride has proven to be a valuable catalyst, particularly for the polymerization of polypropylene. It is believed that, in order to be a high efficiency catalyst, co-crystals of the two materials are required, although it is not certain that the product is in fact a co-crystal and not some other combination of the two trichlorides. Mere mixtures of the two are not as effective as catalysts as are combinations as described herein, so it is considered that a molecular combination is formed. The material that has a high catalyst efficiency is a purple powder and the only known reliable measure of the material's quality is a determination of the ability of the catalyst to promote a high yield of high quality polymer. It is known that some techniques for manufacturing the combination produce an amorphous brown powder which does not have high catalyst efficiency.

In order to evaluate the catalyst produced in any given manufacturing process, tests are made of the catalyst efficiency, namely the quantity of polymer that can be made with a given quantity of catalyst. Another measure of the quality of catalyst is the isotacticity of polypropylene made while employing the catalyst. Several such tests are known and employed for evaluating catalysts. Thus, for example, U.S. Pat. 3,241,913 sets forth examples of tests for catalyst efficiency and degree of isotacticity which are suitable for evaluating catalysts. Other well known tests employed in the plastics industry may be employed if desired.

It has been found that in order to obtain a high yield of high quality polypropylene it is desirable to have co-crystals near the stoichiometric proportion of three moles of titanium trichloride per mole of aluminum trichloride. It is also found to be highly desirable that the combined crystals be substantially free of titanium tetrachloride, aluminum metal and iron. Such a catalyst has a high efficiency and produces a high degree of isotacticity in the polymer. When small quantities of catalyst are made under laboratory conditions, the properties of the material are readily controlled so that high quality catalysts can be produced. In a large scale production process, on the other hand, production control requires greater care and economies must be effected wherever possible in order to minimize the costs of the product without sacrificing quality.

The broad process for production of co-crystals of titanium trichloride and aluminum trichloride is well known and involves the reaction $$3TiCl_4 + Al = 3TiCl_3 \cdot AlCl_3$$

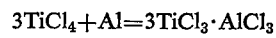

which is normally conducted in an excess of titanium tetrachloride so that the reaction progresses rapidly. The composition having one mole of aluminum trichloride with each three moles of titanium trichloride is known as the stoichiometric composition. After the reaction is completed, the product is dried to remove excess titanium tetrachloride which would contaminate the final product. A conventional technique for removing titanium tetrachloride involves vaporization by heating the catalyst at a temperature above the boiling point of the titanium tetrachloride. It is found, however, that at the temperatures used for removing the titanium tetrachloride, aluminum trichloride also has a substantial volatility, and heating for a sufficient time and at a temperature to remove substantially all of the titanium tetrachloride volatilizes a substantial amount of aluminum trichloride, thereby upsetting the desired composition of the co-crystals.

It is, therefore, desirable to employ a process for producing a combination of titanium trichloride and aluminum trichloride wherein the effects of aluminum trichloride vaporization are alleviated, and a stoichiometric or other desired composition is produced in the catalyst. Such a process should also be economical and not otherwise diminish the catalyst efficiency or diminish the degree of isotacticity obtainable in a polymer made with the catalyst.

SUMMARY OF THE INVENTION

Thus, in the practice of this invention according to a preferred embodiment there is provided an improved process for making a desired composition of titanium trichloride and aluminum trichloride by reaction of titanium tetrachloride and aluminum, including the step of including an excess of aluminum trichloride in the initial reaction mixture for subsequent vaporization and, particularly, by ball milling the excess aluminum trichloride with aluminum powder prior to reaction with titanium tetrachloride.

DRAWING

Objects and many of the attendant advantages of this invention will be appreciated as the same becomes better understood by reference to the following detailed description when considered in connection with the accompanying drawing which comprises a block diagram of a batch process for making co-crystals of titanium trichloride and aluminum trichloride according to principles of this invention.

DESCRIPTION

As mentioned hereinabove, an important process for production of co-crystals of titanium trichloride and aluminum trichloride involves reduction of titanium tetrachloride by aluminum metal. The drawing in this application illustrates in block form a batch process of this nature. In this block diagram, only the principal operative elements are portrayed, and it will be apparent to one skilled in the art that many collateral elements such as pumps, transfer devices, valves, controlling and metering devices, and the like are omitted from the diagram since they are conventional and not of such a nature as would affect practice of this invention.

As illustrated in this preferred embodiment, there is provided an initial ball mill 10 which is a conventional steel mill charged with steel balls and operable at room temperature in a conventional manner. Finely divided aluminum metal is placed in the ball mill 10, while an inert gas floods the area to prevent oxidation, along with a quantity of anhydrous aluminum trichloride, about which more will be described hereinafter. The ball mill 10 is closed, and the mixture of aluminum and aluminum trichloride is blanketed with a low pressure of an inert gas such as nitrogen or the like. This mixture is dry ground for about one day in the ball mill in order to disrupt oxide coatings on the aluminum, and thereby activate the aluminum powder for more rapid reaction with titanium tetrachloride, and also to comminute the aluminum trichloride and intimately mix it with the aluminum. By dry grinding is meant ball milling of the powders in the absence of a liquid.

After milling in the ball mill 10 for about one day, the aluminum metal and aluminum trichloride mixture is transferred to a reactor 11 which contains titanium tetrachloride at an initial temperature of less than about 90° C. so that the exothermic reaction of aluminum and titanium tetrachloride does not initially overheat the reactor. The reactor is, for example, an upright cylindrical vessel capable of containing several thousand pounds of titanium tetrachloride, and may merely be a steel vessel, although it is preferred that the reactor be glass lined for minimizing possibilities of corrosion and pickup of iron in the final product. The reactor 11 is a closed vessel charged with inert gas such as nitrogen or the like to prevent oxidation of the reactive materials therein. Once the reaction has commenced, the reactor is maintained at a temperature between about 136° and 200° C., preferably in the range of about 160° to 180° C. The pressure in the reactor is preferably maintained at about 20 p.s.i.g. to control boiling of the titanium tetrachloride which at atmospheric pressure has a boiling point of about 136° C.

The reactor may be stirred if desired to maintain the slurry well mixed throughout the reaction period. Significantly, however, it has been found in a reaction mixture of liquid titanium tetrachloride and activated aluminum produced by ball milling with aluminum trichloride that stirring is not required. Thus the reaction proceeds well without any external connections. This is of importance since stirring action is introduced by a shaft rotated by a motor outside the reactor. The problem of sealing a rotating shaft in the corrosive, high temperature environment of such a reactor is quite difficult, and often results in high maintenance costs and prolonged non-productive down time. A significant advance is provided by obviating any need for stirring during the reaction.

The mixture of liquid titanium tetrachloride and finely divided aluminum is maintained in the reactor 11 at a gentle boil for approximately one day, which is found to be sufficient for substantially complete reaction between titanium tetrachloride and the aluminum powder. A reflux condenser 12 is employed with the reactor in the conventional manner for returning vaporized titanium tetrachloride to the slurry in the reactor. Throughout the reaction in the reactor, an excess of titanium tetrachloride is maintained. It should be noted that the mixture in the reactor remains a slurry as the aluminum powder is consumed since the titanium trichloride-aluminum trichloride co-crystals formed by the reaction are a finely divided, purple solid at these temperatures.

When the reaction is effectively completed and the aluminum powder consumed, the mixture of titanium tetrachloride and co-crystals of titanium trichloride and aluminum trichloride is transferred to a drier 14 which is merely a closed steel vessel heated to a temperature in the range of from about 150° to 190° C. which is above the boiling point of titanium tetrachloride. If desired, an inert sweep gas, such as nitrogen, may be passed through the drying powder in the drier for carrying vaporized titanium tetrachloride therefrom. The titanium tetrachloride vapor produced in the drier 14 is carried to a conventional condenser 15 where it is reliquified and returned to a titanium tetrachloride storage vessel 16 for return to the reactor 11 as required. Excess nitrogen or other inert gas is released by way of a vent 17.

The mixture of titanium trichloride-aluminum trichloride co-crystals and titanium tetrachloride is maintained in the drier for about one day, which is found to be sufficient to effectively remove substantially all of the excess titanium tetrachloride from the catalyst.

As noted hereinabove, during removal of the titanium tetrachloride by heating, some of the aluminum trichloride in the co-crystals is also vaporized. The co-crystals of the two trichlorides are not necessarily in the desired proportion of titanium trichloride and trichloride, and a continuum of proportions can occur. Thus, for example, if the catalyst material transferred from the reactor to the drier comprises co-crystals having exactly a desired 3:1 ratio, excess heating in the drier would reduce the proportion of aluminum trichloride below the desired amount with a consequent reduction in catalyst quality.

In order to counteract the loss of aluminum trichloride in the drier it is preferred, in practice of this invention, to commence the drying operation with co-crystals having more than the stoichiometric amount of aluminum trichloride. The excess aluminum trichloride is introduced into the raw materials prior to reaction between the aluminum and titanium tetrachloride, and is preferably ball milled with the aluminum in the ball mill 10, hereinabove described.

By adding the aluminum trichloride in the ball mill with the finely divided aluminum, additional advantages besides compensation for the vaporization of aluminum trichloride in the drier, are obtained. One relatively minor advantage is that the anhydrous aluminum trichloride is comminuted in the ball mill at the same time that the aluminum powder is being activated for faster reaction with the titanium tetrachloride. Anhydrous aluminum trichloride is readily available in particles about pea size, and the smaller size produced upon ball milling is preferable.

An additional advantage arises from the presence of free aluminum trichloride in the initial reaction mixture of titanium tetrachloride and aluminum powder which promotes a more rapid initiation of the reaction to produce the co-crystals, and an appreciably shorter total reaction time is therefore obtained. In the absence of any aluminum trichloride in the reaction mixture, the reaction commences slowly and proceeds only at a slow rate until a quantity of aluminum trichloride is built up in the mixture as a result of the reaction.

Still another benefit gained by ball milling an excess of aluminum trichloride in combination with the aluminum powder is the effect of the aluminum trichloride as a grinding aid for the aluminum. Aluminum is a malleable material which if ground in a ball mill without a grinding aid tends to cake badly since the clean, freshly ground surfaces of the aluminum particles weld together, and particles too large for effective reaction with titanium tetrachloride may be formed. By providing an excess of aluminum trichloride in a ball mill with the aluminum, welding of the aluminum particles and caking is substantially avoided.

It is preferred to employ a weight of aluminum trichloride in the ball mill in the range of about 1:1 to about 3:1 relative to the weight of aluminum powder. When the excess aluminum chloride added to the reaction mixture is less than about 1:1 relative to the aluminum, a sufficient quantity may not be present to maintain stoichiometry when the co-crystals have been heated for sufficient time to remove substantially all of the titanium tetrachloride. When the quantity of aluminum trichloride is greater than a proportion of about 3:1 to the weight of aluminum, a time or temperature greater than required to merely remove the titanium tetrachloride may be required to remove enough aluminum trichloride to bring the resultant co-crystals to the preferred stoichiometric proportions.

The exact quantity of aluminum trichloride to be employed within the preferred range is readily determined by routine testing so that the desired composition is routinely produced with the particular equipment and processing parameters employed in a selected production plant drier.

After the co-crystals are dried to the desired composition they are transferred from the drier 14 to a conventional ball mill 18 which may b a steel mill charged with steel balls. The mill is closed and filled with nitrogen to prevent oxidation of the contents. The bill mill 18 is operated with supplemental cooling on the exterior, such as low temperature water or a refrigerant, so that the catalyst therein is not overheated during the ball milling operation. The ball mill is operated in this manner for a period of from one to several days to activate the catalyst. It has been found that ball milling the dry titanium trichloride-aluminum trichloride co-crystals significantly increases catalyst efficiency. After ball milling for catalyst activation, several batches of the material may be combined and mixed in a blender 19 for achieving greater product uniformity.

As an example of a process performed according to the principles of this invention, about 50 pounds of aluminum powder and 150 pounds of anhydrous aluminum trichloride were charged into a ball mill filled with a normal load of steel balls. A normal load fills about 50% of the mill volume with balls. This charge was blanketed with nitrogen gas and milled for 24 hours at approximately the optimum operating speed for the mill. The ball milled material was then mixed with about 6,000 pounds of titanium tetrachloride in a glass lined reactor or Pfaudler kettle where it was continuously stirred and heated under reflux conditions in the range of 160° to 170° C. for about 24 hours to effect complete reaction of the aluminum powder with the titanium tetrachloride. The resultant slurry was then transferred to a drier where it was heated in the temperature range of from about 136° to 170° C. A sample of the resultant co-crystals taken after 18 hours in the drier showed a proportion of titanium trichloride to aluminum trichloride of almost exactly 3:1.

Although only one example has been set forth herein of a process conducted according to principles of this invention, many modifications and variations will be apparent to one skilled in the art. It is therefore to be understood that within the scope of the appended claims the invention may be practiced otherwise than as specifically described.

What is claimed is:

1. A process for producing a co-crystallized titanium trichloride and aluminum trichloride catalyst in a selected proportion of titanium trichloride to aluminum trichloride comprising the steps of:

mixing in the absence of inert hydrocarbon diluent finely divided aluminum, aluminum trichloride and an excess of titanium tetrachloride based on the aluminum, the weight ratio of the aluminum trichloride to aluminum being in the range of from about 1:1 to 3:1;

maintaining the mixture under conditions favoring reaction of the aluminum and titanium tetrachloride until substantially complete reaction of the aluminum is obtained;

heating the reaction mixture for a sufficient time to remove substantially all excess titanium tetrachloride and remove that portion of aluminum trichloride above which is necessary for the selected proportion in the final co-crystallized catalyst; and recovering a dry co-crystallized titanium trichloride and aluminum trichloride catalyst of the selected proportion.

2. A process as defined in claim 1 wherein the selected proportion comprises approximately three moles of titanium trichloride per mole of aluminum trichloride.

3. A process as defined in claim 1 wherein the finely divided aluminum and aluminum trichloride are ground together prior to mixing with the titanium tetrachloride.

4. A process as defined in claim 1 wherein the aluminum and aluminum trichloride are dry ground together in a ball mill for about one day prior to mixing with the titanium tetrachloride.

5. A process as defined in claim 4 wherein the mixture is maintained at a temperature and pressure wherein the titanium tetrachloride boils and wherein additional mechanical stirring is avoided.

6. A process as defined in claim 4 wherein the selected proportion comprises approximately three moles of titanium trichloride per mole of aluminum trichloride.

7. A process for producing co-crystals of titanium trichloride and aluminum trichloride in a proportion of substantially three moles and one mole, respectively, comprising the steps of:

ball milling dry aluminum powder and dry aluminum trichloride together in the range of from about 1:1 to 3:1 by weight of aluminum trichloride relative to aluminum for a sufficient time to comminute the aluminum trichloride and activate the aluminum;

mixing the ball milled aluminum and aluminum trichloride with an excess of titanium tetrachloride in the absence of an inert hydrocarbon diluent;

heating the mixture at approximately the boiling point of titanium tetrachloride for a sufficient time to react all of the aluminum powder with titanium tetrachloride;

heating the reaction product at a temperature greater than the boiling point of titanium tetrachloride for a sufficient time to substantially completely remove excess titanium tetrachloride and a portion of the aluminum trichloride; and ball milling the heated reaction product to activate said product.

8. A process for producing a purified co-crystallized titanium trichloride and aluminum trichloride catalyst substantially in a stoichiometric proportion of about three moles of titanium trichloride per mole of aluminum trichloride and substantially free of titanium tetrachloride and aluminum comprising the steps of:

dry milling finely divided aluminum and aluminum trichloride, the weight ratio of aluminum trichloride to aluminum being in the range of about 1:1 to 3:1;

reacting the dry milled aluminum and aluminum trichloride with an excess of titanium tetrachloride in the absence of an inert hydrocarbon diluent at temperatures in the range of about 136° C. to 200° C. under reflux conditions to form a slurry of co-crystallized titanium trichloride and aluminum trichloride catalyst in excess titanium tetrachloride;

drying the slurry of catalyst and excess titanium tetrachloride at elevated temperatures for a time sufficient to vaporize and remove substantially all of the excess titanium tetrachloride and remove that portion of aluminum trichloride above which is necessary for the selected proportion in the final co-crystallized catalyst; and recovering a dry co-crystallized titanium trichloride and aluminum trichloride catalyst having a stoichiometric proportion of about three moles of titanium trichloride per mole of aluminum trichloride.

References Cited

UNITED STATES PATENTS

| | | | |
|---|---|---|---|
| 3,172,865 | 3/1965 | Fennell | 252—429 C X |
| 3,420,809 | 1/1969 | Tornquist | 252—442 X |
| 3,531,420 | 9/1970 | Tornquist | 252—442 |
| 3,128,252 | 4/1964 | Tornquist et al. | 252—429 A |
| 3,298,965 | 1/1967 | Tornquist | 252—429 C |
| 3,301,494 | 1/1967 | Tornquist | 75—0.5 A |
| 3,494,910 | 2/1970 | Takashi et al. | 252—429 C X |
| 3,001,951 | 9/1961 | Tornquist et al. | 252—429 C |

PATRICK P. GARVIN, Primary Examiner

U.S. Cl. X.R.

252—429 C